United States Patent [19]
Cohen

[11] Patent Number: 5,917,825
[45] Date of Patent: Jun. 29, 1999

[54] LAN MESSAGE ROUTING SYSTEM

[75] Inventor: Ron Cohen, Rehovot, Israel

[73] Assignee: Rad Network Devices, Ltd., Tel Aviv, Israel

[21] Appl. No.: 08/647,441

[22] Filed: May 7, 1996

[51] Int. Cl.[6] .............................. H04L 12/28; H04L 12/56
[52] U.S. Cl. ................................................. 370/401
[58] Field of Search ................................. 370/401, 402, 370/403, 410, 217, 221, 225, 226; 395/200.15, 200.16, 200.79, 200.8, 200.69; 340/827

[56] References Cited

U.S. PATENT DOCUMENTS

| | | | |
|---|---|---|---|
| 5,309,437 | 5/1994 | Perlman et al. | 370/401 |
| 5,325,362 | 6/1994 | Aziz | 370/405 |
| 5,485,455 | 1/1996 | Dobbins et al. | 370/401 |
| 5,500,860 | 3/1996 | Perlman | 370/401 |
| 5,583,996 | 12/1996 | Tsuchiya | 370/258 |
| 5,636,216 | 6/1997 | Fox et al. | 370/402 |
| 5,684,800 | 11/1997 | Dobbins et al. | 370/401 |

OTHER PUBLICATIONS

Fred J. McClimans, Taking Stock of LAN Switching, Business Communication Review Magazine, Apr. 1995, pp. 2–8.
Stephen Saunders, Traffic Jam at the LAN Switch, Data Communications Magazine, Nov. 21, 1994, pp. 53–58.
Douglas Comer, Internetworking With TCP/IP, 2nd. Edition, Vol. I, pp. 73–87, 109–120, vol. II, 37–57, 81–101, Prentice Hall, 1992–1993.
Marshall Rose, The Open Book: A Practical Presentation on OSI, Prentice Hall, 1990, pp. 29–32.
Wiener Feibel, Novell's Complete Encyclopedia of Networking, Novell Press, 1995, pp. 18–19, 725–737.
Dave Katz, David Piscitello, Bruce Cole and James V. Luciani, NBMA Next HOP Resolution Protocol (NHRP): Work In Progress, Internet: The IETF home page at www.i-etf.cnri.reston.va.us., pp. 1–46.
Internet RFC 791, Internet Protocol, IETF home page at www.itef.cnri.reston.va.us., Sep. 1981, pp. i–iv, 1–45.
Internet RFC 792, Internet Control Message Protocol, IETF home page at www.ietf.cnri.reston.va.us., Sep. 1981, pp. 1–21.
Internet RFC 826, An Ethernet Address Resolution Protocol, IETF home page at www.ietf.cnri.reston.va.us., Nov. 1982.
Internet RFC 1122, Requirements for Internet Hosts—Communication Layers, IETF home page at www.ietf.cnri.reston.va.us., Oct. 1989, pp. 1–116.
Internet RFC 1577, Classical IP and ARP Over ATM, IETF home page at www.ietf.cnri.reston.va.us., Jan. 1994, pp. 1–17.
Internet RFC 1812, Requirements for IP Version 4 Routers, IETF home page at www.ietf.cnri.reston.va.us., Jun. 1995, pp. 1–175.

*Primary Examiner*—Ajit Patel
*Attorney, Agent, or Firm*—Helgott & Karas, P.C.

[57] ABSTRACT

A method for routing messages within a LAN between a first station attached to the LAN and belonging to a first network and a second station attached to the LAN and belonging to a second network, the method including providing a router operatively attached to both the first network and the second network, sending a frame from the first station to the router, the frame including a destination address of the second station, and sending a redirect message from the router to the first station, the redirect message including a pool address associated with the second station.

19 Claims, 5 Drawing Sheets

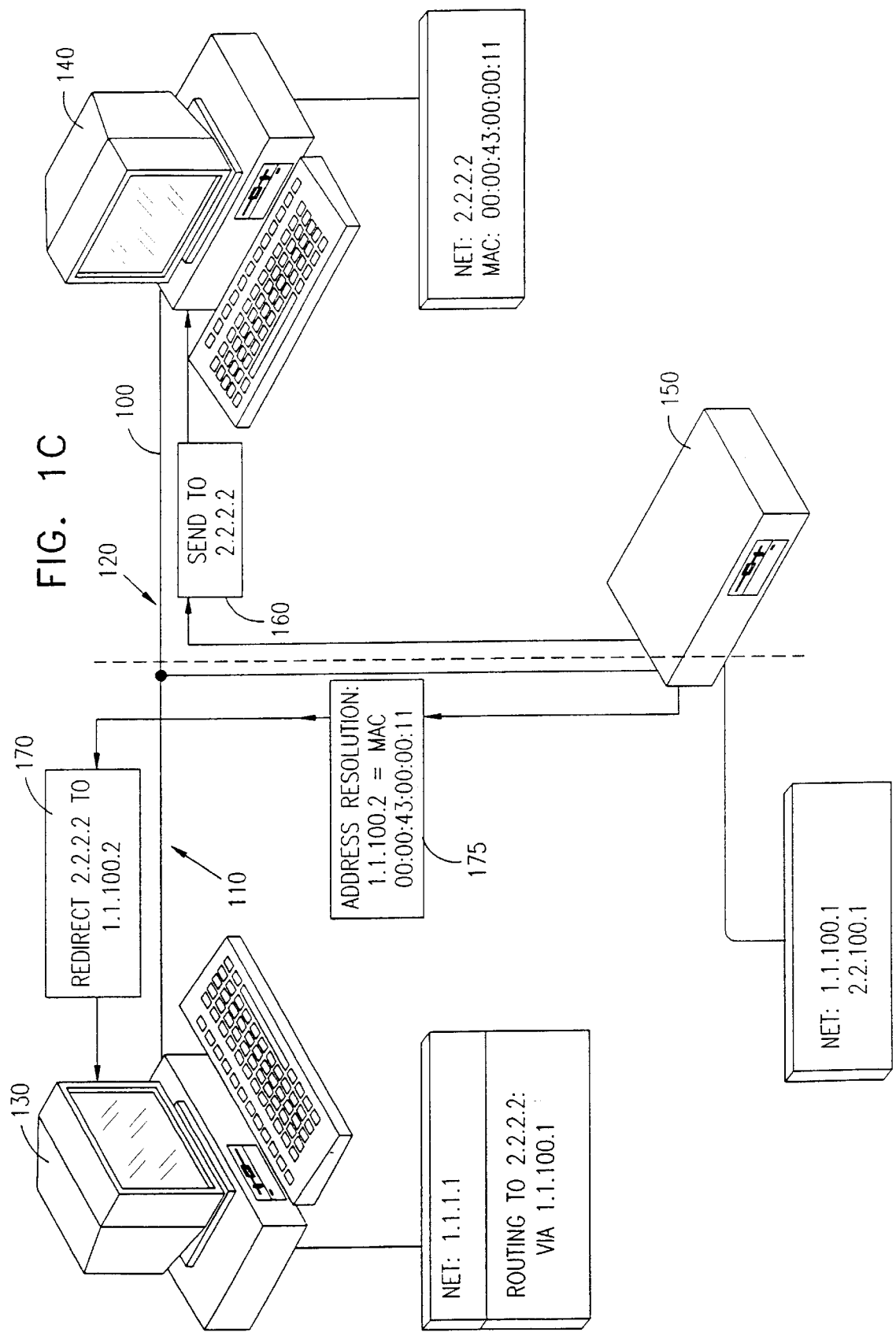

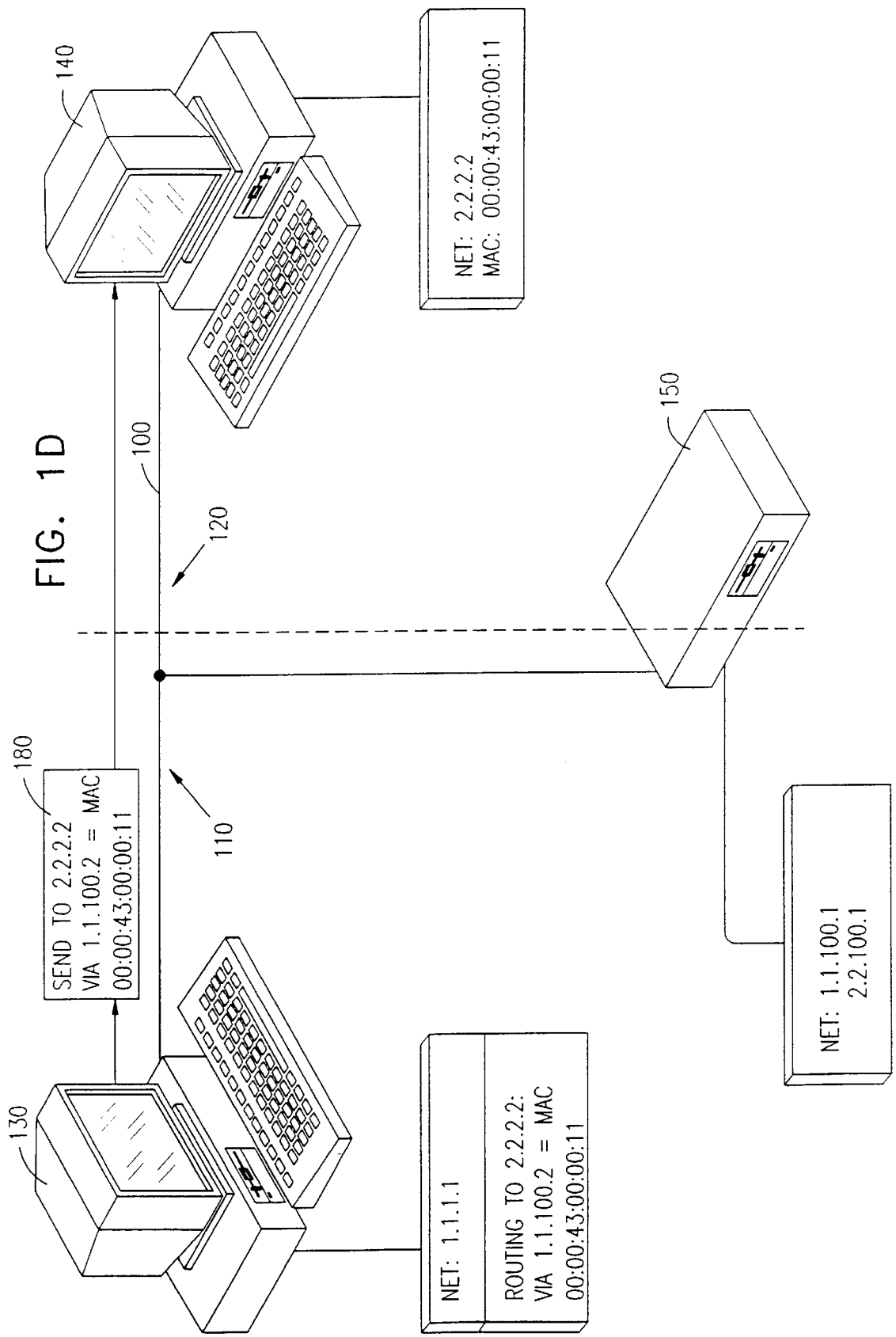

LAN MESSAGE ROUTING SYSTEM

FIELD OF THE INVENTION

The present invention relates to networks in general, and in particular to local area networks (LANs) or switched media networks including a plurality of networks.

BACKGROUND OF THE INVENTION

Local area networks (LANs) and switched media networks, providing services similar to LANs, are well known in the art. TCP/IP networks are a particularly widely used type of network. Many LANs are TCP/IP based LANs. Local area networks in general and relevant aspects of TCP/IP in particular are described in the following publications:

Douglas Comer, *Internetworking with TCP/IP*, second edition, vols. I–III, Prentice Hall, 1992–1993;

Wiener Feibel, *Novell's Complete Encyclopedia of Networking*, Novell Press, 1995;

Marshall Rose, *The Open Book: A Practical Presentation on OSI*, Prentice Hall, 1990;

*Internetworking Standard for Bridging*, IEEE 802.1 (D), IEEE, 1991;

Fred J. McClimans, "Taking Stock of Lan Switching", *Business Communication Review* magazine, April 1995;

Stephen Saunders, "Traffic Jam at the LAN Switch", *Data Communications* magazine, Nov. 21, 1994;

"NBMA Next Hop Resolution Protocol (NHRP)", Work in Progress, Dave Katz, David Piscitello, Bruce Cole, and James V. Luciani, available over the Internet from, for example, the IETF home page at www.ietf.cnri.reston-.va.us.; and the following Internet RFC documents, which are available over the Internet from, for example, the IETF home page at www.ietf.cnri.reston.va.us: RFC 791 ("Internet Protocol"); RFC 826 ("Address Resolution Protocol"); RFC 792 ("Internet Control Messaging Protocol"); RFC 1122 ("Requirements for Internet hosts—communication layers"); and RFC 1812 ("Requirements for IP Version 4 Routers").

A LAN may be subdivided into a plurality of networks. Typically, such a LAN uses the TCP/IP protocol and each of the plurality of networks is therefore an IP network. In a switched media network, hosts connected to a switched media may be assigned to a plurality of virtual networks. The term "network", as used throughout the present specification, refers to one of the one or more networks into which a LAN is subdivided, and may also be taken herein to include a "virtual network" within a switched media network. From the point of view of a station attached to the LAN and assigned to one of the networks, stations on another one of the networks are seen as being separate in the sense that direct communication with a station in another network is not allowed, even though the networks may be physically connected as part of the same LAN. Standard network protocols, such as TCP/IP, require that messages from a first station on a first network designated for a second station on a second network be sent via a router which is attached to both networks and which is responsible for routing messages between the two networks, even if the two stations are physically connected as pail of the same LAN. Alternatively, to a router which is attached to both networks, messages may be sent to a first router attached to the first network and then forwarded from the first router to one or more additional routers, eventually reaching a router which is attached to the second network.

When the first network and the second network are both networks within the same LAN or virtual networks belonging to the same switch, inefficiencies and overloading of the router may result as traffic which might be carried directly between the first station and the second station is actually sent via the router. Prior art systems fail to provide a satisfactory solution to these problems.

The disclosures of the above publications and of the publications cited therein are hereby incorporated by reference. The disclosures of all publications mentioned in this specification and of the publications cited therein are hereby incorporated by reference.

SUMMARY OF THE INVENTION

The present invention seeks to provide an improved system for routing messages between stations on different networks which are part of the same LAN or which are connected to the same switch in a switched media LAN. In the present method, messages, which are also referred to herein as frames, are sent from the first station directly to the second station without intervention of the router. This is preferably accomplished by having the router notify the first station to redirect messages to the second station, typically using a protocol designed for notifying the first station of a preferred router to use to reach the second station. Thus, the first station acts as if it is sending subsequent messages to a preferred router, when in fact messages are being sent directly to the second station.

There is thus provided in accordance with a preferred embodiment of the present invention a method for routing messages within a LAN between a first station attached to the LAN and belonging to a first network and a second station attached to the LAN and belonging to a second network, the method including providing a router operatively attached to both the first network and the second network, sending a frame from the first station to the router, the frame including a destination address of the second station, and sending a redirect message from the router to the first station, the redirect message including a pool address associated with the second station.

Further in accordance with a preferred embodiment of the present invention the method also includes forwarding the frame from the router to the second station.

Still further in accordance with a preferred embodiment of the present invention also includes sending at least one subsequent frame from the first station directly to the second station without intervention of the router.

There is also provided in accordance with another preferred embodiment of the present invention a method for routing messages within a LAN between a first station in a first network and a second station in a second network, the method including sending a frame from the first station directly to the second station without intervention of a router.

Further in accordance with a preferred embodiment of the present invention the LAN includes a conventional LAN.

Still further in accordance with a preferred embodiment of the present invention the LAN includes a switched media LAN.

Additionally in accordance with a preferred embodiment of the present invention the method also includes sending an address resolution message from the router, the address resolution message including the pool address associated with the second station and a hardware address of the second station.

Moreover in accordance with a preferred embodiment of the present invention the hardware address includes a MAC address.

Further in accordance with a preferred embodiment of the present invention the steps of sending a frame and sending a redirect message include sending using a TCP/IP protocol.

Still further in accordance with a preferred embodiment of the present invention the step of sending a frame includes sending using a TCP/IP protocol.

Additionally in accordance with a preferred embodiment of the present invention the router includes a plurality of connected routers, and wherein at least one of the plurality of connected routers is operatively attached to the first network, and wherein at least one of the plurality of connected routers is operatively attached to the second network.

There is also provided in accordance with another preferred embodiment of the present invention a system for routing messages within a LAN between a first station attached to the LAN and belonging to a first network and a second station attached to the LAN and belonging to a second network, the system including a router operatively attached to both the first network and the second network, wherein the first station sends a frame to the router, the frame including a destination address of the second station, and wherein the router sends a redirect message to the first station, the redirect messages including a pool address associated with the second station.

There is also provided in accordance with another preferred embodiment of the present invention a system for routing messages within a LAN, the system including a first station attached to the LAN and belonging to a first network, a second station attached to the LAN and belonging to a second network, and a router operatively attached to both the first network and the second network, wherein the first station sends a frame to the router, the frame including a destination address of the second station, and wherein the router sends a redirect message to the first station, the redirect message including a pool address associated with the second station.

BRIEF DESCRIPTION OF THE DRAWINGS

The present invention will be understood and appreciated from the following detailed description, taken in conjunction with the drawings in which:

FIGS. 1A–1D are simplified partly pictorial, partly block diagram illustrations of a system for routing messages between a first station in a first network and a second station in a second network, the system being constructed and operative in accordance with a preferred embodiment of the present invention.

DETAILED DESCRIPTION OF PREFERRED EMBODIMENTS

Figure 1A:
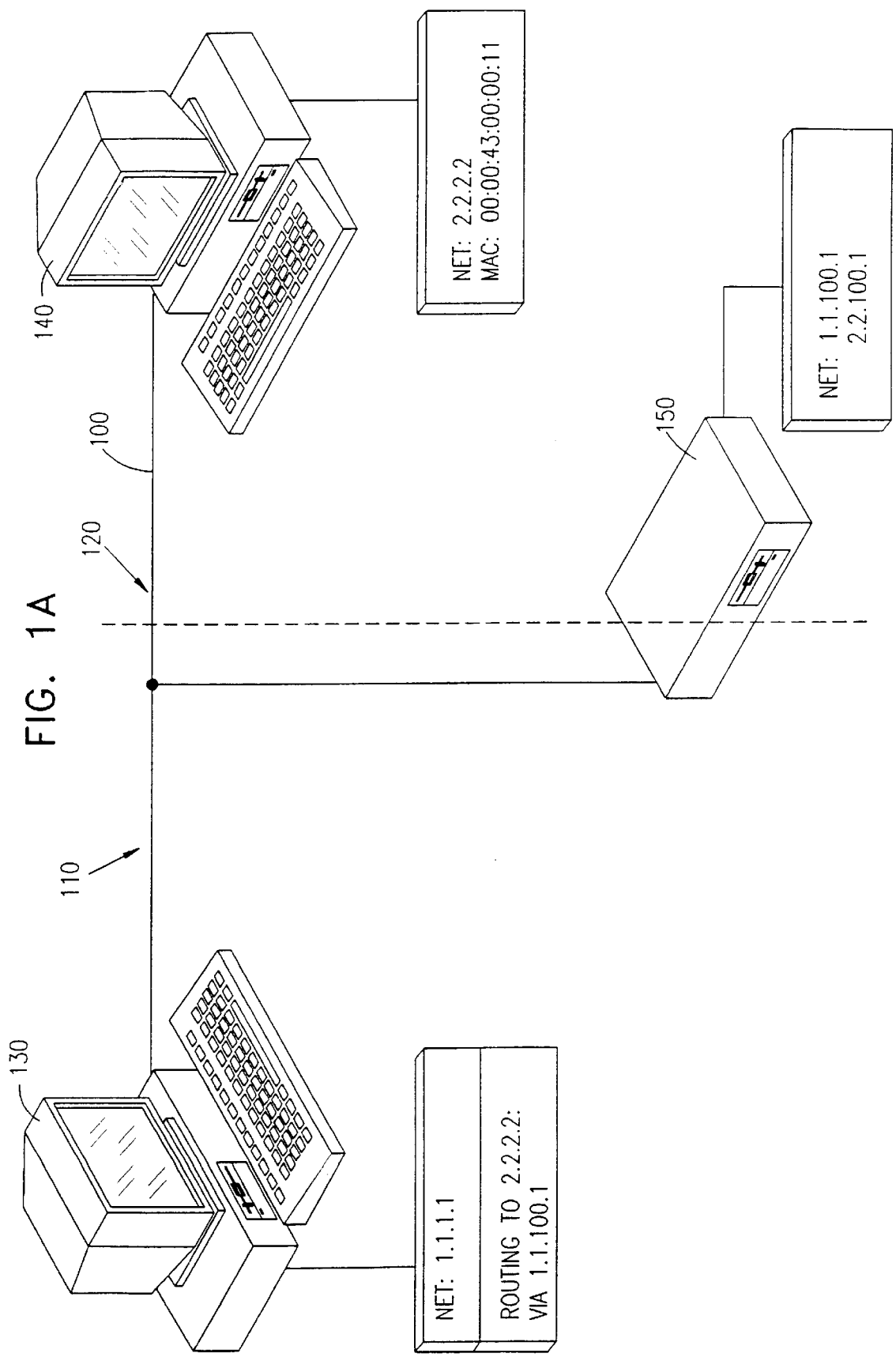

Reference is now made to FIGS. 1A–1D which are simplified partly pictorial, partly block diagram illustrations of a system for routing messages between a first station in a first network and a second station in a second network, the system being constructed and operative in accordance with a preferred embodiment of the present invention.

The system of FIGS. 1A–1D preferably comprises a local area network (LAN) 100. The LAN 100 may comprise either a conventional LAN or a switched media LAN comprising a switch (not shown), as is well-known in the art. The LAN 100 preferably comprises a plurality of networks, shown in FIGS. 1A–1D as a first network 110 and a second network 120. While only two networks are shown in FIGS. 1A–1D, it is appreciated that any number of networks, including a large plurality of networks, may be used. Typically, the LAN 100 comprises a TCP/IP based LAN, and each of the plurality of networks, such as the first network 110 and the second network 120, comprises an IP network. TCP/IP based networks, including elements thereof useful in understanding the present invention, are described in the following RFCs, referred to above: RFC 791; RFC 826 RFC 792; RFC 1122; and RFC 1812.

The system of FIGS. 1A–1D also comprises a plurality of stations, such as a first station 130 which is comprised in the first network 110 and a second station 140 which is comprised in the second network 120. The first station 130 and the second station 140 may each be any suitably programmed network station, as is well known in the art, particularly any station conforming to the RFC 1122 specification, referred to above. Such a station may be programmed with any suitable software such as, for example, NetManage's Chameleon software. While only two stations are shown in FIGS. 1A–1D, it is appreciated that any number of stations, including a large plurality of stations, may be used. It is also appreciated that other conventional apparatus used in networks and not shown in FIGS. 1A–1D, such as bridges and other network apparatus, may also be used.

The apparatus of FIGS. 1A–1D also comprises a router 150, which may be any appropriate conventional router, as is well-known in the art, and having additional capabilities as described below. One example of and appropriate router is a Vgate Router Server, commercially available from RAD Network Devices Ltd., Atidim Technological Park, Bldg. 1, Tel Aviv 61131, Israel.

It is appreciated that, although FIGS. 1A–1D show only one router attached to both networks, more than one router may be used, in which case the first router need only be connected to the first network, with messages intended for the second network being forwarded to a router attached to the second network, such multi-router forwarding being well known in the art. It is appreciated that, throughout the present specification and claims, the term "router" may apply also to more than one router, as described herein.

As is well known in the art, from the point of view of a station attached to the LAN 100 and assigned to one of the networks, such as the first station 130, stations on another one of the networks, such as the second station 140, are seen as being separate, in that messages may not be sent directly between the first station 130 and the second station 140. The system of FIGS. 1A–1D may use any appropriate network protocol such as, for example, TCP/IP. Standard network protocols, such as TCP/IP, require that messages from the first station 130 on the first network 110 designated for the second station 140 on the second network 120 be sent via a router, such as the router 150, which is attached to both networks and which is responsible for routing messages between the two networks. In prior art systems, the router is responsible for receiving and forwarding such internetwork messages.

Figure 1B:
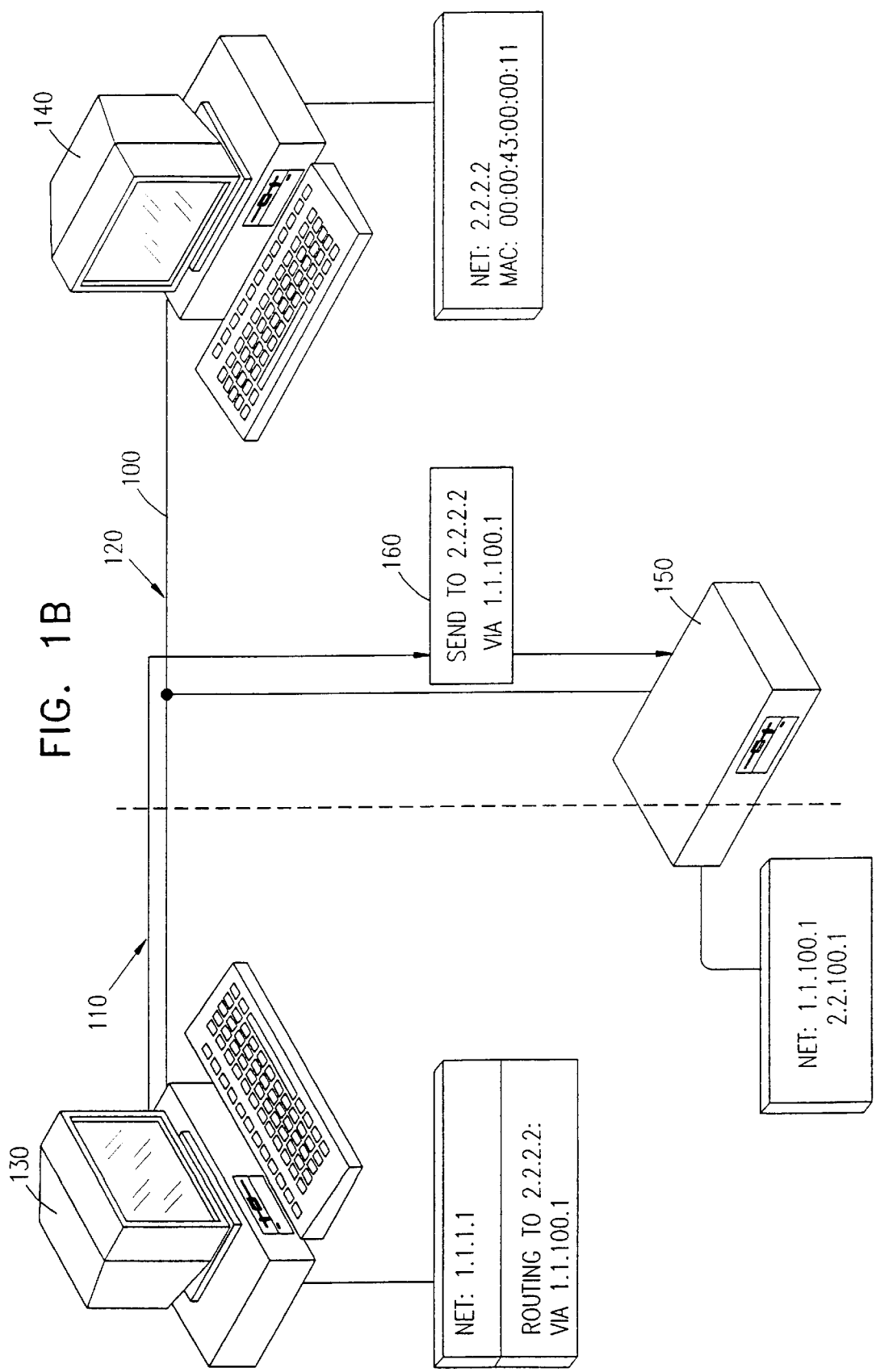

The operation of the system of FIGS. 1A–1D is now briefly described. In FIG. 1A it is seen that the first station 130, having network address 1.1.1.1, has routing information indicating that messages for the second station 140, having network address 2.2.2.2, are to be routed via the router, having network address 1.1.100.1. In FIG. 1B, the first station 130 sends a first message 160, intended for the second station at network address 2.2.2.2, to the router 150. In FIG. 1C, the router 150 forwards the first message 160 to the second station 140. In addition, the router 150 sends a redirect message 170 to the first station 130.

In prior art systems, redirect messages are sent from a router to a station in order to inform the station of a better router to use in the future for routing messages to a particular destination. In the present invention, by contrast, the redirect message 170 is preferably sent from the router 150 to the first station 130, the redirect message preferably comprising a newly assigned network address, known as a pool address, associated with the second station 140. Furthermore, the router 150 optionally sends an unsolicited address resolution message 175 to the first station 130, indicating the MAC address associated with the pool address. It is appreciated that sending the unsolicited address resolution message 175 may be preferable because no further address resolution is required to find the MAC address associated with the pool address, for sending subsequent messages directly to the MAC address. However, if the unsolicited address resolution message 175 is not sent, it is appreciated that the pool address may be resolved into a MAC address by the router 150 using conventional address resolution methods. It is appreciated that, in the case where a plurality of routers is used, the MAC address information may be transmitted using protocols such as NHRP, as described in Katz et al, "NBMA Next Hop Resolution Protocol (NHRP)", referred to above.

Thus, as seen in FIG. 1D, a subsequent message 180, sent from the first station 130 to the second station 140, typically appears, to the first station 130, to be directed to a router but is actually sent directly to the second station 140. In this manner, without violating the rules of a pre-existing protocol such as the TCP/IP protocol, messages are preferably sent directly from the first station 130 to the second station 140 without the intervention of a router.

A MAC address, as is well-known in the art, is the physical address of any device connected to a LAN. The MAC address is unique, and comprises 6 bytes. The MAC address is part of the second layer of the OSI 7-layer model and appears in the MAC header at the beginning of a packet. Typically, a packet comprises the MAC address of the destination station and the MAC address of the originating station.

A network address, as is well-known in the art, is a protocol-dependent logical address of any device connected to a LAN. The network address is unique, but the form of the network address varies between different protocols. The network address is part of the third layer of the OSI 7-layer model and appears in the network layer header of the packet. Typically, a packet comprises the network address of the destination station and the network address of the originating station. Typically, a network address comprises a host number and a network number, so that a network address has a hierarchy of two levels.

MAC addresses and network addresses are described, for example, in Wiener Feibel, *Novell's Complete Encyclopedia of Networking*, referred to above, at pages 18–19.

Preferably, the router 150 records information concerning pool addresses which have been assigned. Such information may take any appropriate form, including a table such as the following:

| HOST IP ADDRESS | DESTINATION IP ADDRESS | POOL IP ADDRESS | DESTINATION MAC ADDRESS |
|---|---|---|---|
| 1.1.1.1 | 2.2.2.2 | 1.1.100.2 | 00:00:43:00:00:11 |

Preferably, the information concerning pool addresses recorded by the router 150 is recorded in non-volatile memory, to prevent possible problems of lost information due to resetting of or power failure to the router 150.

In some networks, access control restrictions may apply; if such an access control restriction does apply and redirecting as described above would violate the access control restriction, such redirecting is preferably not performed by the router 150, and the first station 130 and the second station 140 are allowed to communicate in the conventional manner.

It is appreciated that, in the case of a switched media network, the switch may be programmed to send certain packets, generally known as "unknown" type packets, only to stations assigned to the virtual LAN on which the unknown packet originated. Under some circumstances, it might be desirable for such a packet to reach a station, such as the second station 140, to which messages have been redirected. In such a case, the router 150 is preferably operative to react appropriately to such unknown packets originating on the first LAN 110 and intended for the second station 140, typically by either undoing the redirection described above or by sending ping (ICMP) messages to resolve the "unknown" status of the packets.

Figure 2:
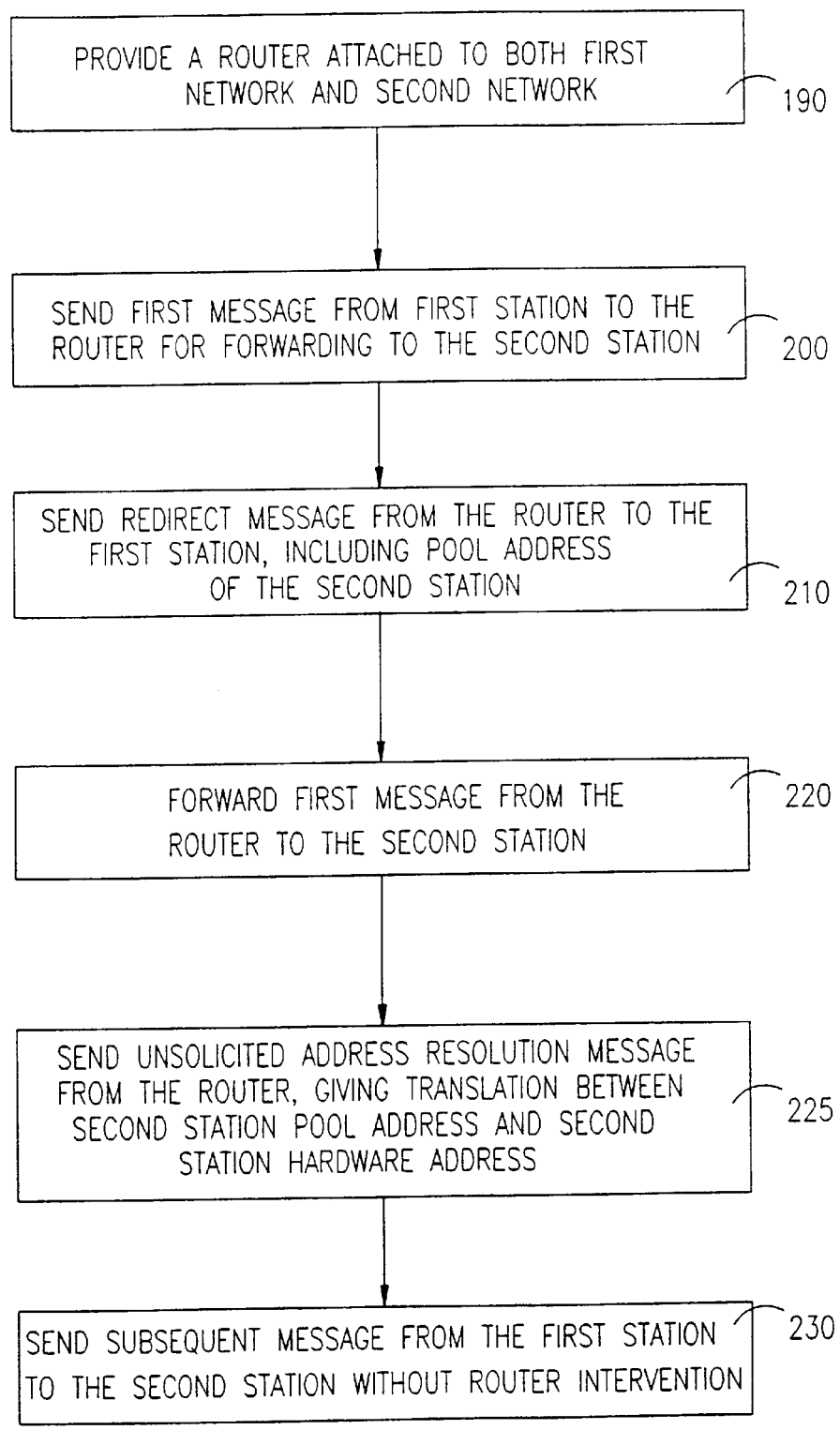
FIG. 2 is a simplified flowchart illustration of a preferred method of operation of the system of FIGS. 1A–1D.

Reference is now made to FIG. 2, which is a simplified flowchart illustration of a preferred method of operation of the system of FIGS. 1A–1D. The method of FIG. 2 preferably includes the following steps:

A router, such as the router 150 of FIGS. 1A–1D, is provided and is attached to both a first network and a second network (step 190). A first message is sent from a first station, comprised in the first network, to the router for forwarding to a second station, comprised in the second network (step 200).

A redirect message is sent from the router to the first station, the redirect message indicating that subsequent messages are to be routed to the second station via a pool address associated with the second station (step 210). The first message is also forwarded from the router to the second station (step 220).

Optionally, and preferably, the router also sends an unsolicited address resolution message giving translation information for translating between the pool address associated with the second station and a hardware address, typically a MAC address, of the second station (step 225).

Subsequent messages from the first station to the second station are sent directly to the second station without router intervention (step 230). As described above, it appears to the first station that the subsequent messages are actually being sent to a preferred router, although the address is the address of the second station.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

I claim:

1. A method for providing an address for touting messages within a LAN between a first station attached to the LAN and belonging to a first network and a second station attached to the LAN and belonging to a second network, the address being provided to the first station by a router, the method comprising:

providing said router operatively attached to both the first network and the second network;

sending a frame from the first station to the router, the frame comprising a destination address of the second station; and sending a redirect message from the router to the first station, the redirect message comprising a pool address associated with the second station.

2. A method according to claim 1 and also comprising:

forwarding the frame from the router to the second station.

3. A method according to claim 1 and also comprising:

sending at least one subsequent frame from the first station directly to the second station without intervention of the router.

4. A method for routing messages within a LAN between a first station in a first network and a second station in a second network, the method comprising:

providing a frame to said first station, said frame comprising a pool address and a MAC address associated with the second station; and sending the frame from the first station directly to the second station without intervention of a router operatively attached to both the first network and the second network, thereby routing a message between the first station and the second station.

5. A method according to claim 1 and wherein the LAN comprises a conventional LAN.

6. A method according to claim 4 and wherein the LAN comprises a conventional LAN.

7. A method according to claim 1 and wherein the LAN comprises a switched media LAN.

8. A method according to claim 4 and wherein the LAN comprises a switched media LAN.

9. A method according to claim 1 and also comprising sending an address resolution message from the router, the address resolution message comprising the pool address associated with the second station and a hardware address of the second station.

10. A method according to claim 9 and wherein the hardware address comprises a MAC address.

11. A method according to claim 1 and wherein the steps of sending a frame and sending a redirect message comprise sending using a TCP/IP protocol.

12. A method according to claim 4 and wherein the step of sending a frame comprises sending using a TCP/IP protocol.

13. A method according to claim 1 and wherein the router comprises a plurality of connected routers, and, wherein at least one of said plurality of connected routers is operatively attached to the first network, and wherein at least one of said plurality of connected routers is operatively attached to the second network.

14. A system for providing an address for touting messages within a LAN between a first station attached to the LAN and belonging to a first network and a second station attached to the LAN and belonging to a second network, the address being provided to the first station by a router, the system comprising:

said router operatively attached to both the first network and the second network, wherein the first station sends a frame to the router, the frame comprising a destination address of the second station, and Wherein the router sends a redirect mesage to the first station, the redirect message comprising a pool address associated with the second station.

15. A system for providing an address for routing messages within a LAN, the system comprising:

a first station attached to the LAN and belonging to a first network;

a second station attached to the LAN and belonging to a second network; and a router operatively attached to both the first network and the second network, wherein the first station sends a frame to the router, the frame comprising a destination address of the second station, and wherein the router sends a redirect message to the first station, the redirect message comprising a pool address associated with the second station.

16. A method according to claim 1 and further comprising designating said pool address as comprising a newly assigned network address.

17. A method according to claim 4 and further comprising designating said pool address as comprising a newly assigned network address.

18. A system according to claim 14 wherein said pool address comprises a newly assigned network address.

19. A system according to claim 15 wherein said pool address comprises a newly assigned network address.

* * * * *